United States Patent [19]

Muto

[11] Patent Number: 5,363,414

[45] Date of Patent: Nov. 8, 1994

[54] METHOD FOR DETECTING A SIGNAL SEQUENCE

[75] Inventor: Hiroyasu Muto, Tokyo, Japan

[73] Assignee: NEC Corporation, Tokyo, Japan

[21] Appl. No.: 98,066

[22] Filed: Jul. 28, 1993

[30] Foreign Application Priority Data

Jul. 28, 1992 [JP] Japan .................. 4-220812

[51] Int. Cl.$^5$ ............................ H04L 27/06
[52] U.S. Cl. .......................... 375/94; 375/83; 364/715.11
[58] Field of Search .............. 375/94, 83, 106, 39, 375/80, 78, 83, 44, 52, 47; 364/715.11; 329/304, 300

[56] References Cited

U.S. PATENT DOCUMENTS 5,113,415  5/1992  Muto ..................... 375/83
5,214,675  5/1993  Mueller et al. ............ 375/94

Primary Examiner—Stephen Chin
Assistant Examiner—Hai H. Phan
Attorney, Agent, or Firm—Foley & Lardner

[57] ABSTRACT

A signal vector obtained by synchronous detection of a received signal is sampled by a sampling rate equal to a symbol rate. The sampled signal vector is rotated by a predetermined angle, and a mean value vector is calculated by latest rotated signal vectors of the number corresponding to a length of a particular signal sequence to be detected. Then, a square and summation value between the mean value and the rotated signal vector used for calculating the mean value vector is calculated. When the square and summation value becomes less than a predetermined value, a particular signal sequence is assumed to be detected.

2 Claims, 8 Drawing Sheets

METHOD FOR DETECTING A SIGNAL SEQUENCE

FIELD OF THE INVENTION

The invention relates to a method for detecting a signal sequence, and more particularly to a method for detecting a particular signal sequence of a constant phase change at each sampling time interval included in a received signal which is obtained by synchronism-detection of a digital angular modulation signal which is possible to be synchronously detected as done in a MSK system.

BACKGROUND OF THE INVENTION

The detection of a signal sequence of a constant phase change at each sampling time interval included in a demodulated signal in accordance with the synchronous detection of a received signal is conventionally carried out.

In a time division multiple access (TDMA) communication system in which transmitting and received signals are at burst state in a multiple transmission line, a synchronism detection signal composed of a particular signal sequence is included in a transmitting signal along with transmitting data, so that a transmitted signal of a burst type can be received in a receiving circuit at each station in which the arrival of the transmitted signal is acknowledged by detecting the synchronism detection signal, and the transmitted data included in the received signal is demodulated. In general, the demodulated signal obtained by demodulating the received signal is defined as a signal vector, because it includes an in-phase component (I channel signal) and a vertical component (Q channel signal).

In conventionally detecting a particular signal sequence included in a received signal, the phase of a signal vector obtained by synchronously detecting the received signal is sampled by a sampling rate equal to a symbol rate, so that a particular signal sequence is detected by detecting a phase difference between first and second phase values having a predetermined value, wherein the second phase value obtained at a selected symbol time and the first phase value obtained at a symbol time prior to the selected symbol time by one symbol are compared in a limited number of consecutive symbols.

However, there is a disadvantage in the conventional method for detecting a particular signal sequence in that noise is added to the transmission line resulting in errors in the ideal phase. This tends to make it impossible for a particular signal sequence to be detected.

SUMMARY OF THE INVENTION

Accordingly, it is an object of the invention to provide a method for detecting a signal sequence in which a particular signal sequence is detected, even if noise is added to a transmission line.

According to the invention, a method for detecting a signal sequence, comprises the receipt of a modulation signal on a carrier signal having phase changes of predetermined angles in a first direction and a second direction opposite to the first direction corresponding to "1" and "0" of symbols to be transmitted, and the detection of a particular signal sequence having a constant phase change at each sampling time interval included in a signal vector obtained by synchronous detection of the modulation signal, wherein:

the method for detecting a signal sequence, comprises the steps of:

sampling the signal vector to provide a sampled value by a sampling rate equal to a symbol rate;

rotating the sampled value to provide a rotated signal vector by a predetermined angle;

calculating a mean value vector from latest rotated signal vectors of a number corresponding to a length of the particular signal sequence;

calculating a square and summation value of a distance between the mean value vector and each rotated signal vector used for a calculation of the mean value vector; and detecting the particular signal sequence in accordance with the square and summation value.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
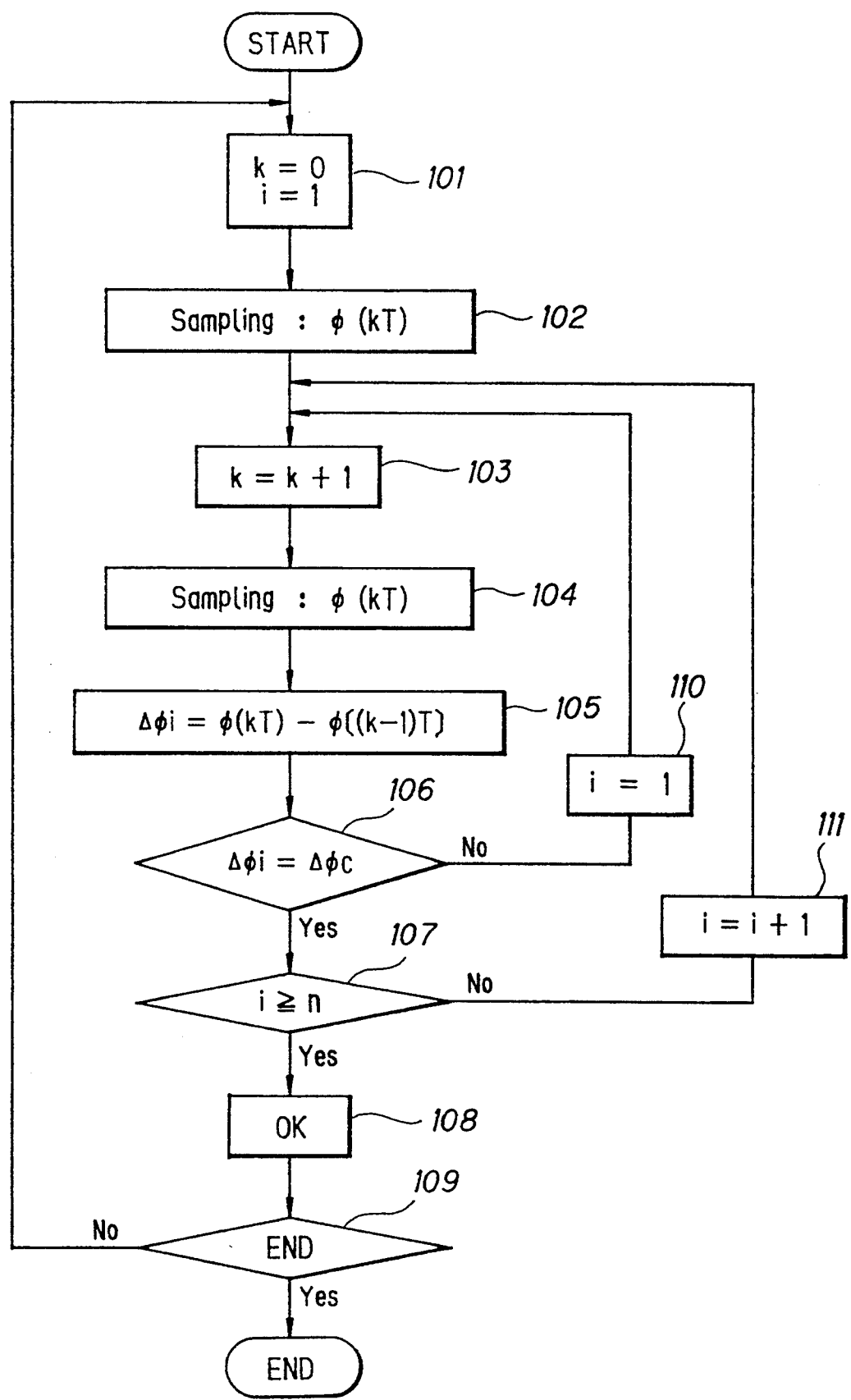
FIG. 1 is a flow chart explaining a conventional method for detecting a particular signal sequence.

Before explaining a method for detecting a particular signal sequence in the preferred embodiments according to the invention, the aforementioned conventional method for detecting a particular signal sequence will be explained in FIG. 1.

The sampling operation in which phase "$\phi(t)$" of a signal vector obtained by synchronously detecting a received signal is sampled by a sampling rate "1/T" equal to a symbol rate is started at a time (t=0) as shown by the steps 101 to 104, and a phase difference "$\Delta\phi1$" is obtained between a phase "$\phi(T)$" sampled at a time (t=T) and a phase "$\phi(0)$" sampled at a time (t=0) which is prior to the time (t=T) by one symbol as shown by the step 105.

Next, the phase difference "$\Delta\phi1$" is determined to coincide with a reference value "$\Delta\phi c$" for the phase change which is predetermined in this comparison as shown by the step 106.

When the coincidence is not found therebetween, a next sampling operation is carried out as shown by the steps 110, 103 and 104. Thereafter, the processing at the step 105 is carried out. On the other hand, when the coincidence is found, it is checked how many times the coincidences are continued as shown by the step 107.

When the number "i" of the coincidences is less than "n" which is a length of a particular signal sequence to be detected, that is, when NO is met at the step 107, a next sampling operation is carried out by the steps 111, 103 and 104. Thereafter, the processing at the step 105 is carried out.

On the other hand, when the number "i" of the coincidences is equal to or more than "n", that is, when YES is met at the step 107, it is determined that the particular signal sequence is detected as shown by the step 108.

In the procedure as described above, the reference value "$\Delta\phi c$" for a phase change used at the step 106 is "$\pi/2$", in case where a modulation method is MSK, and a signal sequence having whole symbols of "1" is detected, while it is $-\pi/2$ in case where a signal sequence having whole symbols of "0" is detected in the MSK method.

The same reference value as above is used in GMSK method in which gause filters are used as base band filters.

In Tamed FM method in which a phase of a signal vector is increased by "$\pi/2$" per one symbol, when three symbols of "1" are continued, it is decreased by "$\pi/2$" per one symbol, when three symbols are continued, and it is not changed, when symbols of "0" and "1" are received alternately, the reference value "$\Delta\phi c$" is "$\pi/2$", when a signal sequence having whole symbols of "1" is detected, it is $-\pi/2$, when a signal sequence having whole symbols of "0" is detected, and it is zero, when a signal sequence having symbols of "0" and "1" to be continued alternately is detected.

In the procedure described as above, there is a case the number "i" of the coincidences is less than a length of a particular signal sequence to be detected, because interference occurs among codes in the presence of delayed signals. In such a case, a measure in which a length of a particular signal sequence to be detected is made longer to a possible extent is adopted, so that a particular signal sequence is regarded to be detected, even if the number "i" of the coincidences is decreased by several times.

Next, a method for detecting a signal sequence in the first preferred embodiment will be explained in FIG. 2.

Figure 2:
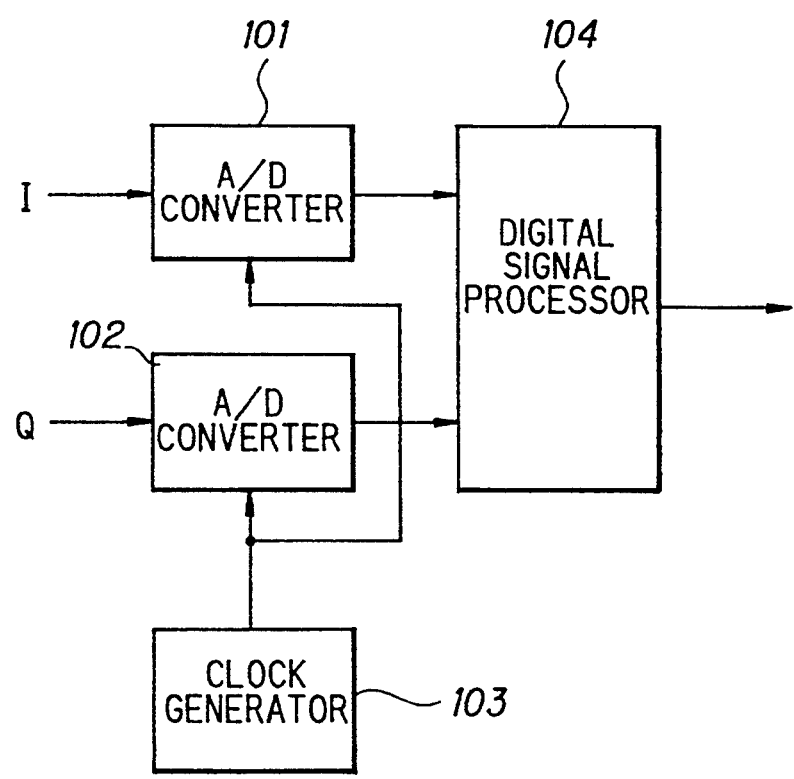
FIG. 2 is a block diagram explaining a method for detecting a particular signal sequence in a first preferred embodiment according to the invention.

FIG. 2 shows analog to digital (A/D) converters 101 and 102 to which I and Q channel signals are supplied from a synchronous detector (not shown), a digital signal processor 104 which is supplied with converted digital signals from the A/D converters 101 and 102 and a clock generator 103 for supplying a clock signal to the A/D converters 101 and 102.

In operation, the clock generator 103 supplies a sampling clock signal of a frequency equal to a symbol rate to the A/D converters 101 and 102, and the I and Q channel signals are converted from an analog value to a digital value in the A/D converters 101 and 102 in accordance with the sampling clock signal supplied thereto. The digital signals are supplied to the digital signal processor 104 in which digital signal processing is carried out to provide a detection result of a signal sequence in the form of a signal vector "X(kT)".

Figure 3:
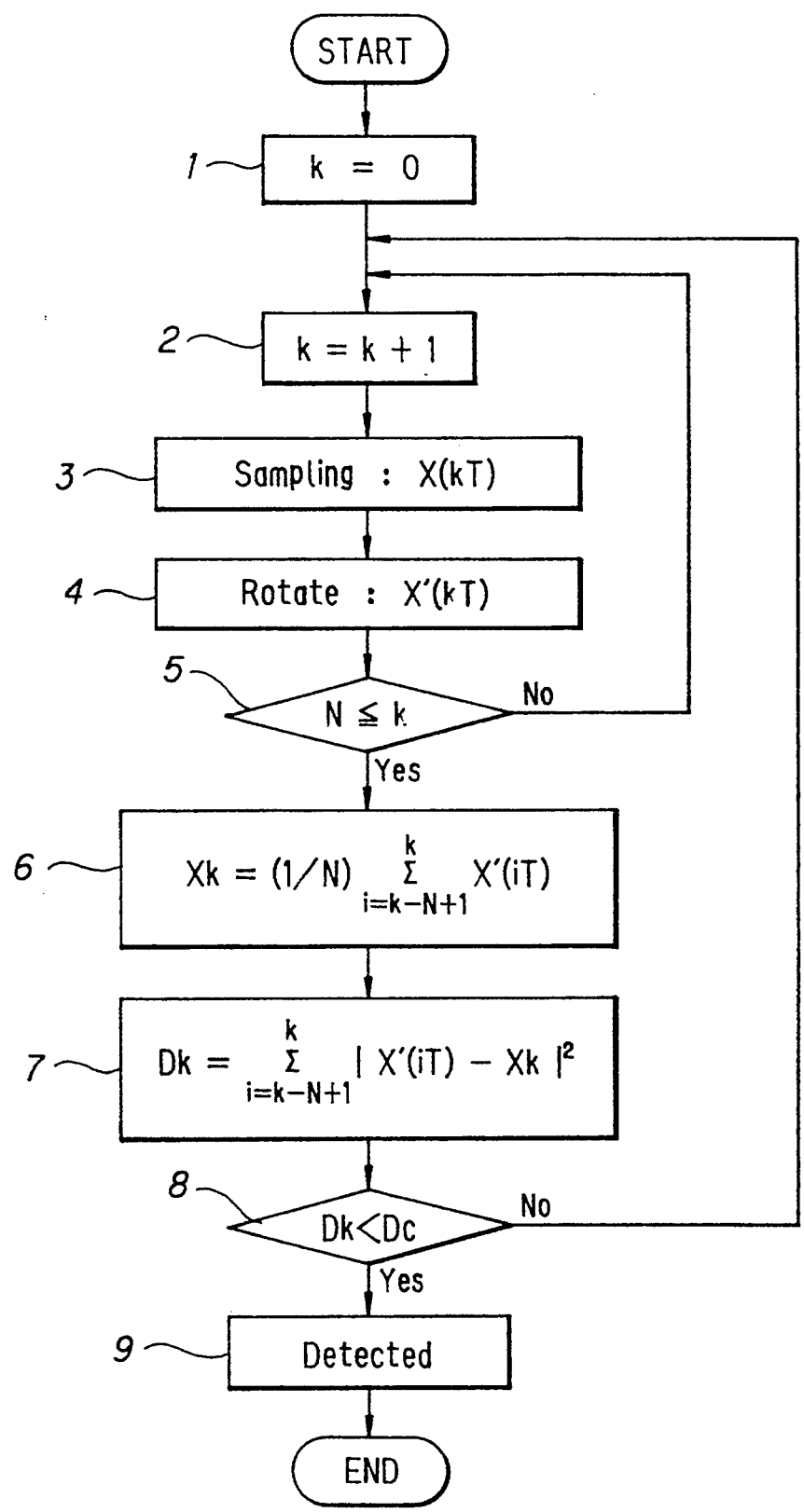
FIG. 3 is a flow chart explaining the procedure of a method for detecting a particular signal sequence in the first preferred embodiment.

Detail of the digital signal processing will be explained in FIG. 3.

At first, "k" is set to be zero (k=0) as shown by the step 1, and "k" is incremented by one at the step 2 (k=k+1). Then, a signal vector "X(t)=[I(t), Q(t)]" obtained by synchronously detecting a received signal is sampled to provide a signal vector "X(kT)=[I(kT), Q(kT)]" by a sampling rate equal to a symbol rate as shown by the step 3.

Next, a signal vector "X'(kT)" is obtained by rotating the signal vector "X(kT)" by an angle "k×$\Delta\phi$R" obtained in accordance with the multiplication of a predetermined angle "$\Delta\phi$R" and "k" as shown by the step 4.

Here, it is assumed that the angle $\Delta\phi$R is $-\pi/2$, when a signal sequence having whole symbols of "1" is detected in the modulation of MSK method, and it is $\pi/2$, when a signal sequence having whole symbols of "0" is detected in the MSK method. Even in the modulation of GMSK method in which a gause filter is used as a base band filter, the same angle $\Delta\phi$R is adopted.

In the Tamed FM method as described before, the angle $\Delta\phi$R is $-\pi/2$, when a signal sequence having whole symbols of "1" is detected, it is $\pi/2$, when a signal sequence having whole symbols of "0", and it is zero, when a signal sequence having symbols of "1" and "0" to be alternately continued.

Then, it is determined whether "k" is more than a length "N" of a signal sequence to be detected as shown by the step 6.

When the value "k" is less than "N", that is, when NO is met at the step 5, the processing of the steps 2 to 5 are carried out, until "k" becomes equal to or more than "N".

On the other hand, when "k" is equal to or more than "N", that is, when YES is met at the step 5, a mean vector value "$X_K$" of the latest N rotated signal vectors "X'[(k−N+1)T]" to "X'(kT)" is calculated by conducting the below equation (1) as shown by the step 6.

$$X_k = (1/N) \sum_{i=k-N+1}^{k} X'(iT) \quad (1)$$

Next, the below equation (2) is conducted to provide a square and summation value "$D_k$", wherein the value "$D_k$" is small, as the latest N rotated signal vectors "X'[(k−N+1)T]" to "X'(kT)" are small in deviation, and it becomes the minimum value, when a signal sequence to be detected is received.

$$D_k = \sum_{i=k-N+1}^{k} |X'(iT) = X_k|^2 \quad (2)$$

Then, the value "$D_k$" is compared with a predetermined reference value "$D_c$" at the step 8, and, when the value "$D_k$" is less than the reference value "$D_c$", a particular signal sequence is regarded to be received as shown by the step 9.

When the value "$D_k$" is equal to or more than the reference value "$D_c$", the procedure returns to the processing of the step 2.

The above described processing are easily realized by using the digital signal processor 104.

Figure 4:
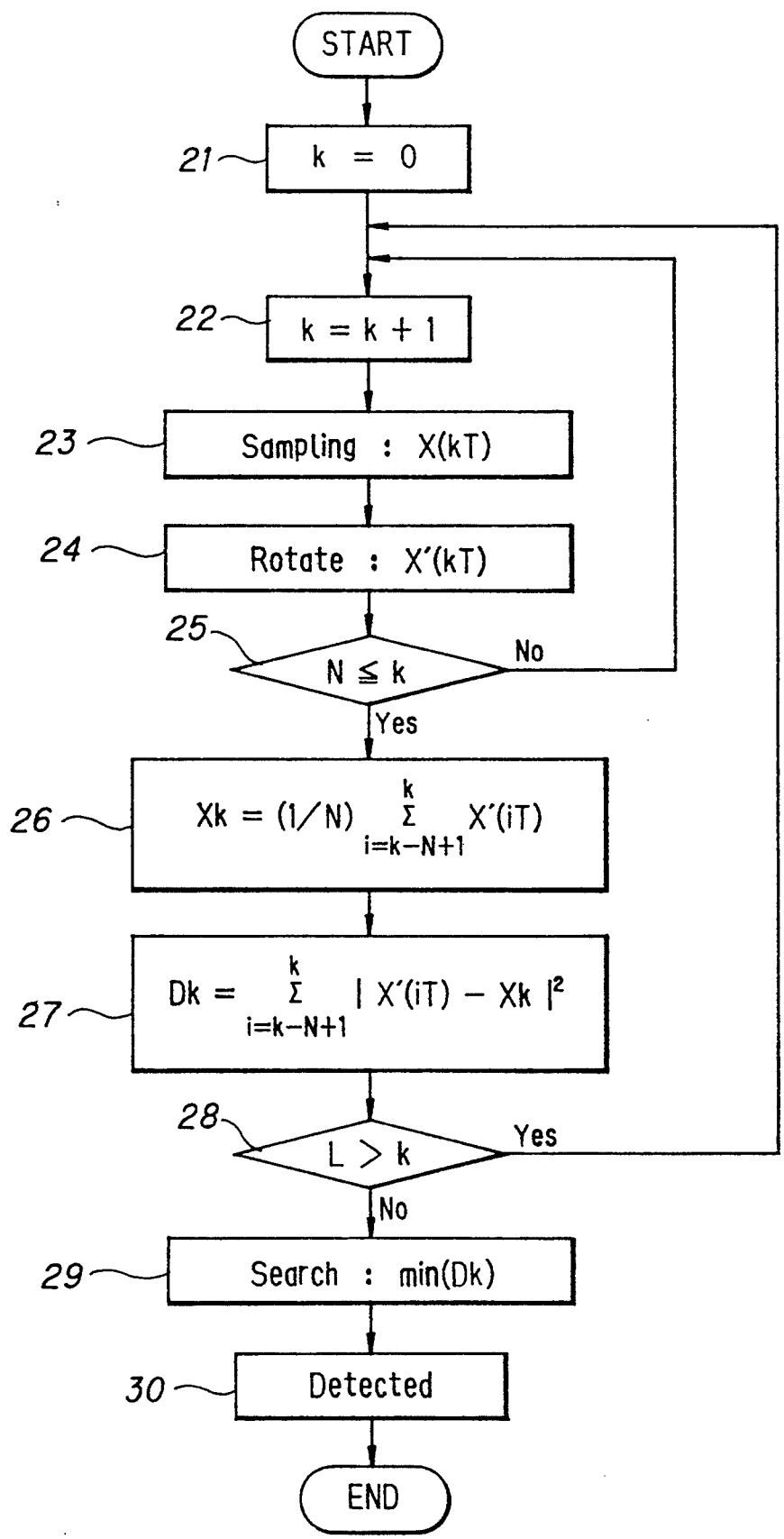
FIG. 4 is a flow chart explaining the procedure of a method for detecting a particular signal sequence in a second preferred embodiment according to the invention.

Next, a method for detecting a particular signal sequence in the second preferred embodiment according to the invention will be explained in FIG. 4.

In the second preferred embodiment, the steps 21 to 27 are the same as those of the steps 1 to 7 in the first preferred embodiment.

At the step 28, a comparison is made between the number "k" of sampling times and a predetermined number "L", wherein the number "L" is set to be an appropriate number by which a signal sequence to be detected is definitely sampled.

When the number "k" is less than the number "L", that is, when YES is met at the step 28, the processing of the steps 22 to 28 are carried out.

On the other hand, when the number "k" is equal to or more than the number "L", that is, when NO is met at the step 28, the minimum value "min($D_k$)" is searched among square and summation values of (L−N+1) in a number calculated at the steps 27 as shown by the step 29. Thus, a signal sequence which has provided the searched minimum value "min($D_k$)" is regarded to be a signal sequence which is to be detected as shown by the step 30.

As explained in the first and second preferred embodiments, the invention is based on the principle as set out below.

Here, it is assumed that whole symbols are of "1" in a signal sequence to be detected.

Figure 5A:
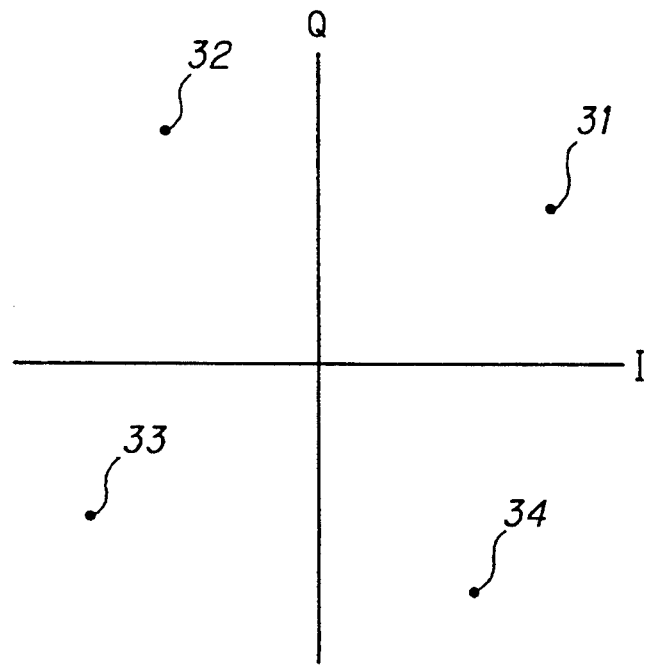
FIGS. 5A and 5B are explanatory diagrams explaining an example in which a signal vector is sampled by a sampling rate equal to a symbol rate.
Figure 5B:
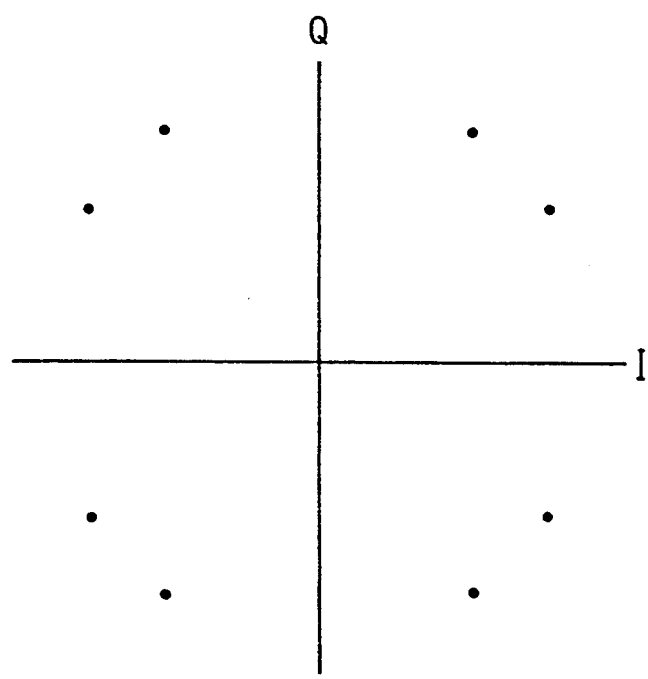

FIGS. 5A and 5B show an example in which a signal vector obtained by synchronously detecting a MSK modulation signal, where no signal is superimposed thereon, is sampled by a sampling rate equal to a symbol rate, wherein FIG. 5A shows a case in which the transition of counter-clock direction as indicated by the reference numerals 31→32→33→34→31 is made on a signal vector "X(kT)", when whole symbols are of "1" in a signal sequence, and FIG. 5B shows a case in which a signal sequence is of random symbols.

Figure 6A:
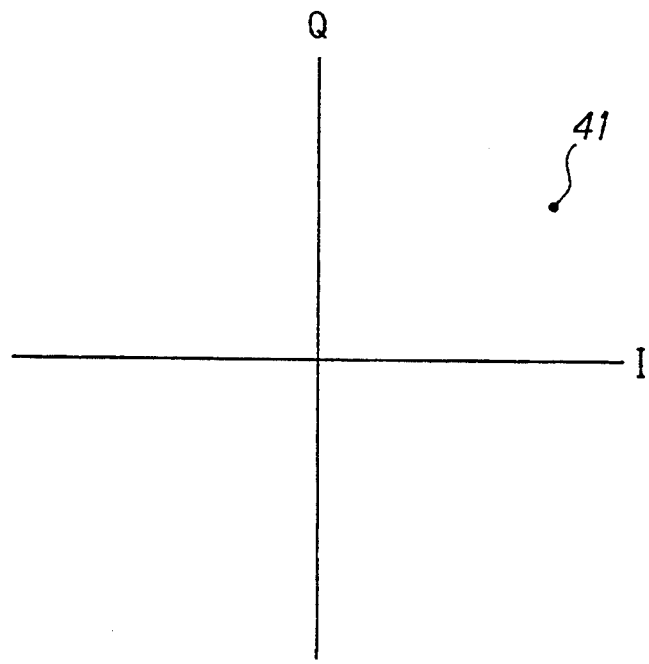
FIGS. 6A and 6B are explanatory diagrams explaining a state in which a sampled signal vector is rotated.

FIG. 6A shows a case in which a signal vector "X'(kT)" after the rotation looks stopped at the point 41, when a signal vector "X(kT)" is rotated at each symbol in the clock direction by an angle "k×90", where whole symbols are of "1" in a signal sequence.

Figure 6B:
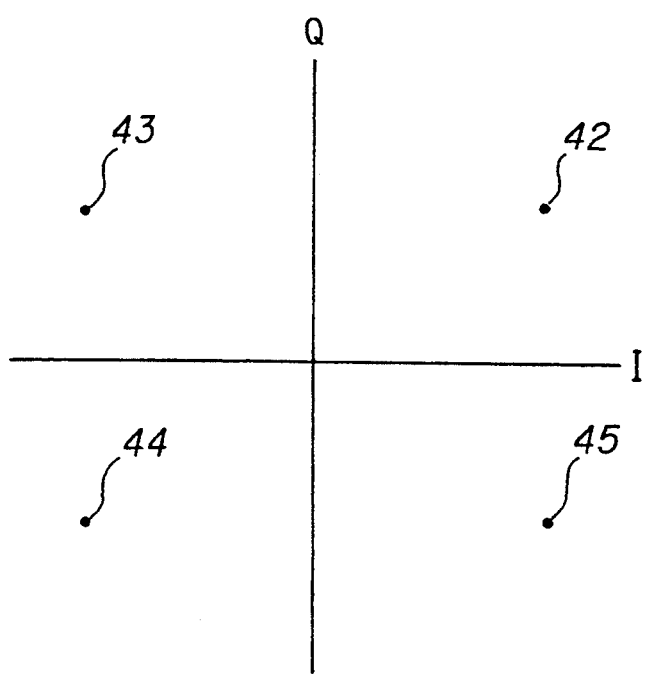

FIG. 6B shows a case in which a signal vector "X'(kT)" after the rotation looks moved on the four points 42, 43, 44 and 45, when a signal vector "X(kT)" is rotated at each symbol in the clock direction by an angle "k×90", where a signal sequence is of random symbols.

Figure 7A:
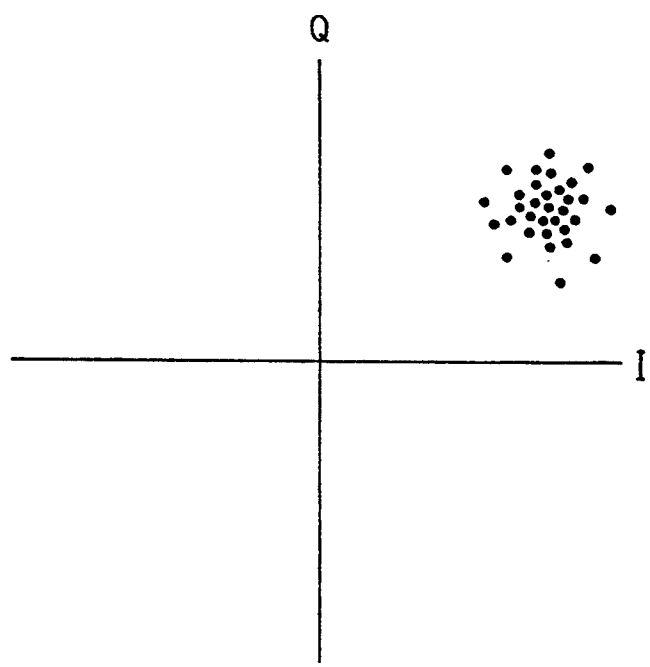
FIGS. 7A and 7B are explanatory diagrams showing a signal vector after the rotation in case where noise is added to a transmission line.
Figure 7B:
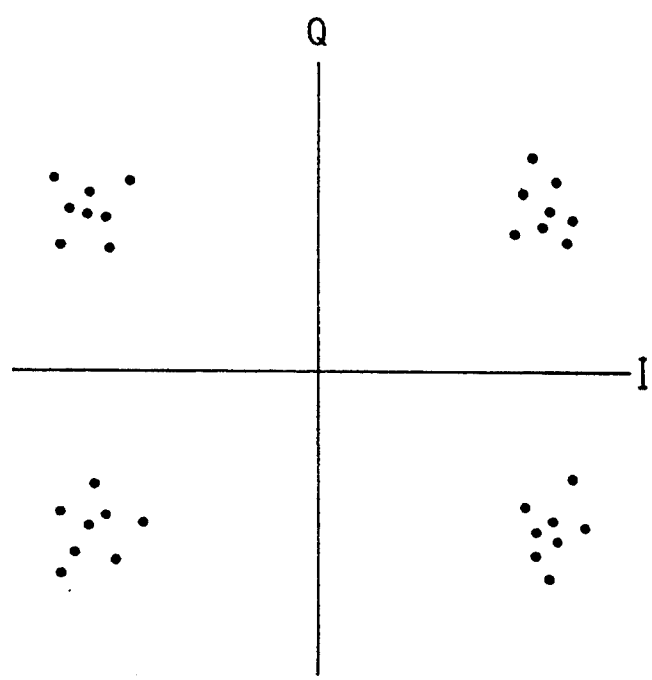

In case where noise is added to a transmission line, a signal vector "X'(kT)" after the rotation is distributed with deviation as shown in FIGS. 7A and 7B.

Figure 8A:
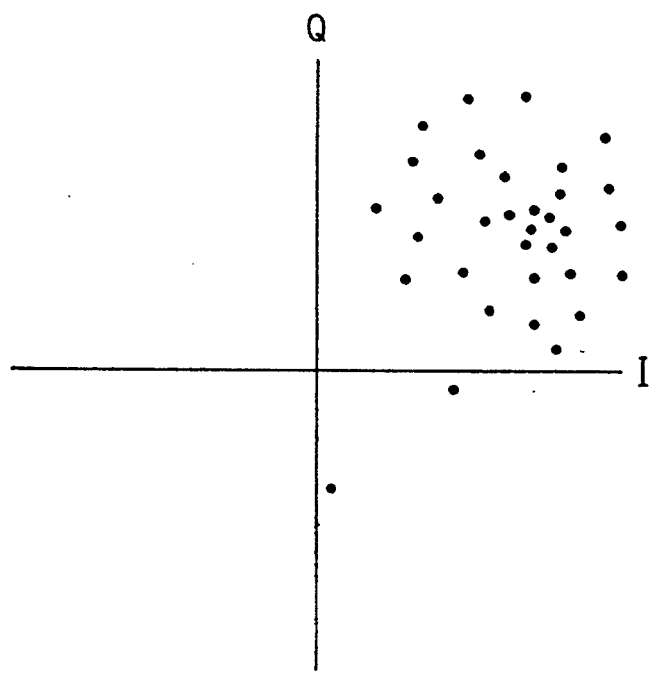
FIGS. 8A and 8B are explanatory diagrams showing a signal vector after the rotation in case where noise of a large level is added to a transmission line.
Figure 8B:
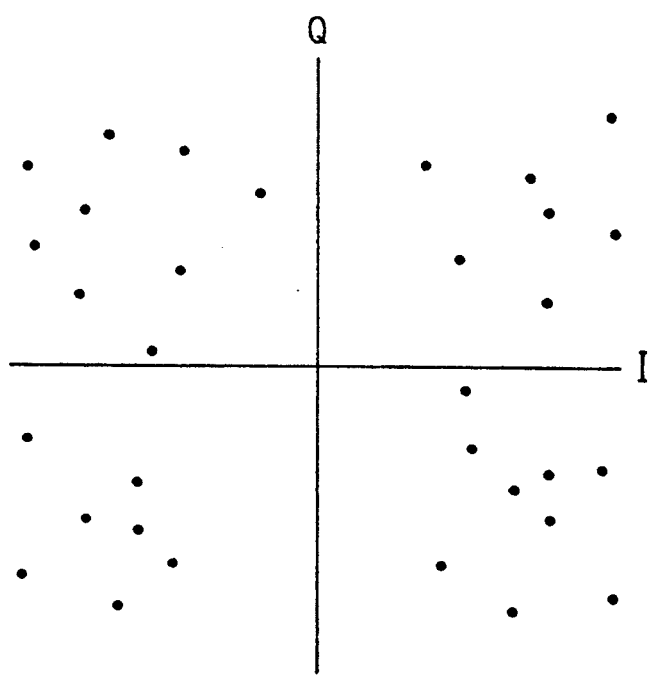

In case where much larger noise is added to a transmission line, a signal vector "X'(kT)" after the rotation is distributed with much larger deviation as shown in FIGS. 8A and 8B.

If it is assumed that noise levels are equal between a first case where whole symbols of a signal sequence are of "1" and a second case where symbols of a signal sequence are random, it is evident that the deviation of a signal vector "X'(kT)" after the rotation is larger in the second case than in the first case.

This makes it possible in the invention that a particular signal sequence having whole symbols of "1" is detected.

As understood from the above explanation, a particular signal sequence having whole symbols of "0" or symbols of "0" and "1" to be alternately continued is detected in accordance with the same principle, if the signal sequence is of a signal vector phase which is changed in a constant direction by a constant angle.

Although the invention has been described with respect to specific embodiment for complete and clear disclosure, the appended claims are not to be thus limited but are to be construed as embodying all modifications and alternative constructions that may occur to one skilled in the art which fairly fall within the basic teachings set forth here.

What is claimed is:

1. A method for detecting a signal sequence, comprising the steps of:
    a) receiving a modulation signal on a carrier signal having phase changes of predetermined angles in a first direction and a second direction opposite to said first direction corresponding to "1" and "0" of symbols to be transmitted;
    b) detecting a particular signal sequence having a constant phase change at each sampling time interval included in a signal vector obtained by synchronous detection of said modulation signal;
    c) sampling said signal vector to provide a sampled value by a sampling rate equal to a symbol rate;
    d) rotating said sampled value to provide a rotated signal vector by a predetermined angle;
    e) calculating a mean value vector from a number of latest rotated signal vectors where said number corresponds to a length of said particular signal sequence;
    f) calculating a square and summation value of a distance between said mean value vector and each of said rotated signal vector used for a calculation of said mean value vector; and
    g) detecting said particular signal sequence when said square and summation value is less than a predetermined value.

2. The method for detecting a signal sequence according to claim 1, further comprising the steps of:
    h) repeating said steps c) to f); and
    i) detecting said particular signal sequence when the square and summation value has a minimum value amongst all calculated square and summation values.

* * * * *